March 25, 1958
W. A. BEASLEY ET AL
2,828,032
SELF-LOADING CARGO VEHICLES
Filed March 7, 1955
4 Sheets-Sheet 1
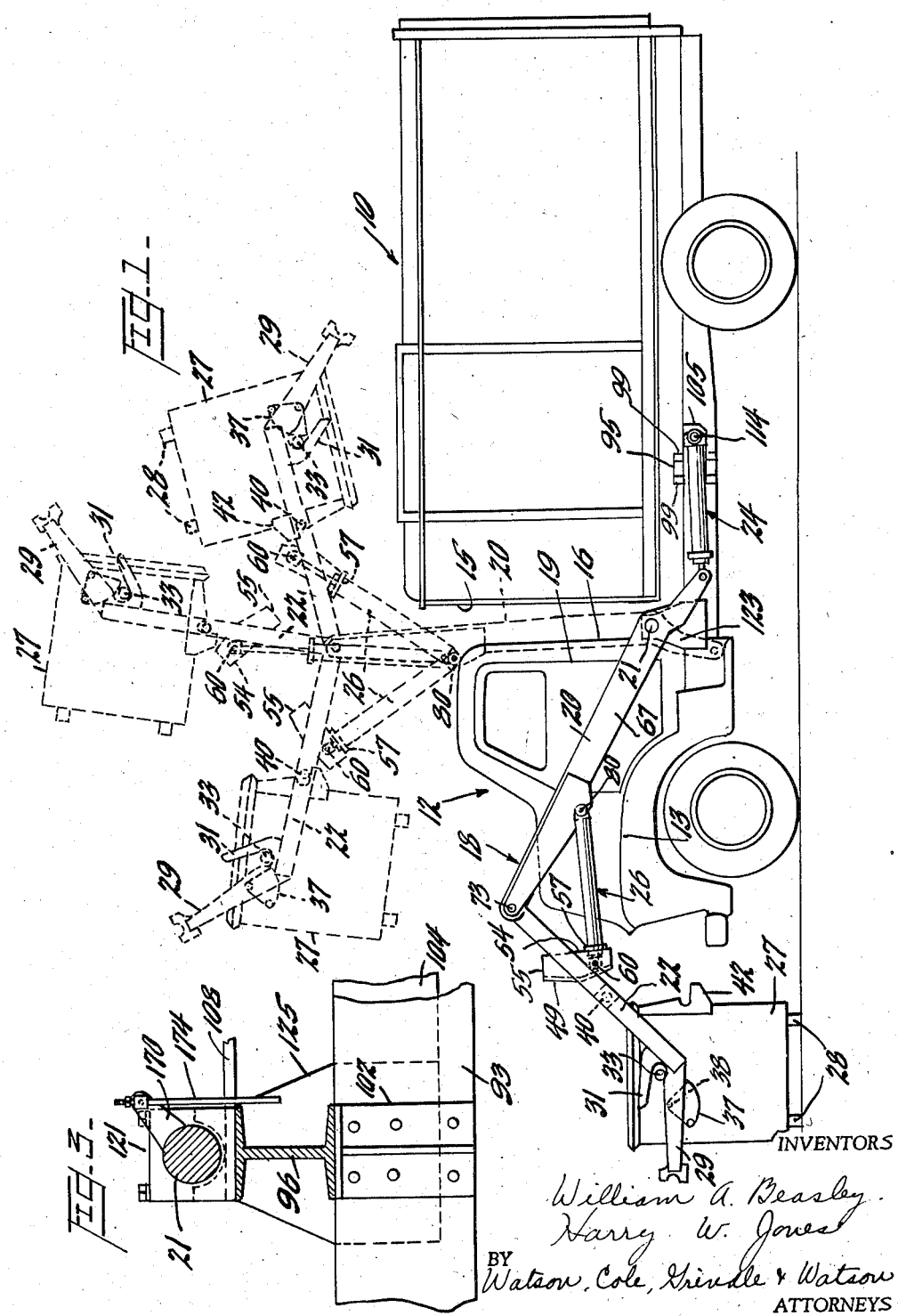
INVENTORS
William A. Beasley.
Harry W. Jones
BY
Watson, Cole, Grindle & Watson
ATTORNEYS March 25, 1958  W. A. BEASLEY ET AL  2,828,032
SELF-LOADING CARGO VEHICLES
Filed March 7, 1955  4 Sheets-Sheet 2
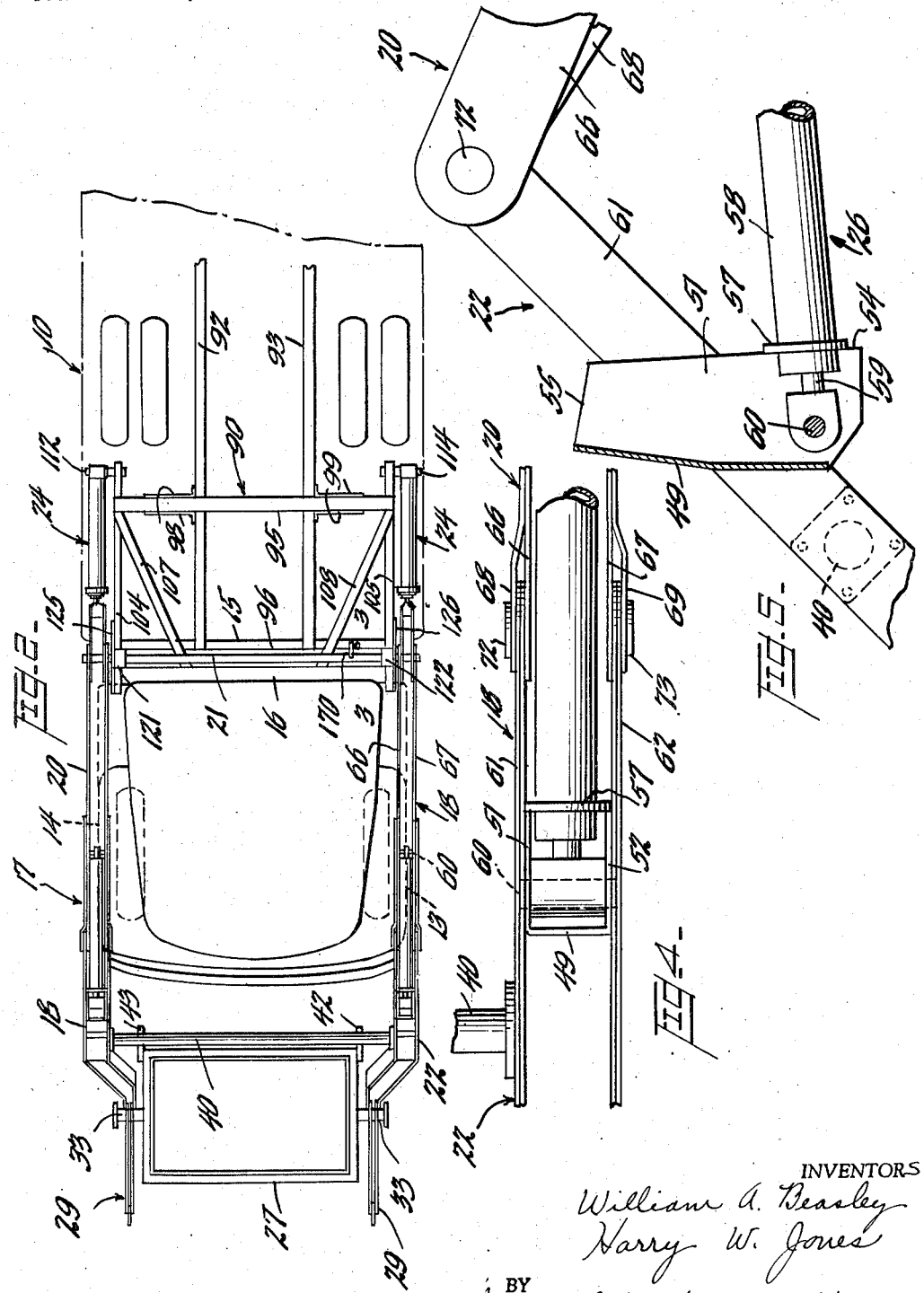
INVENTORS
William A. Beasley
Harry W. Jones
BY
Watson, Cole, Grindle & Watson
ATTORNEYS

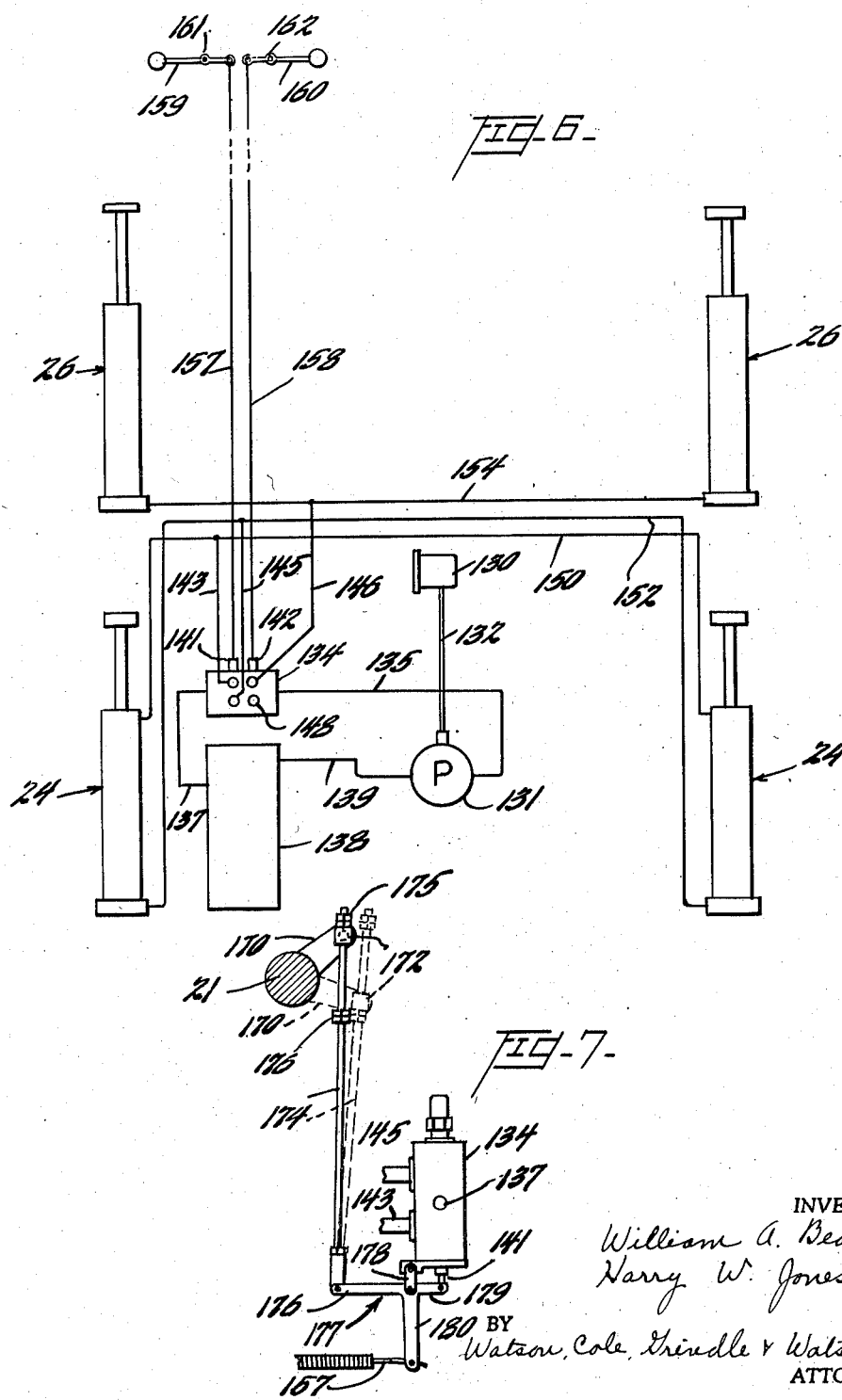

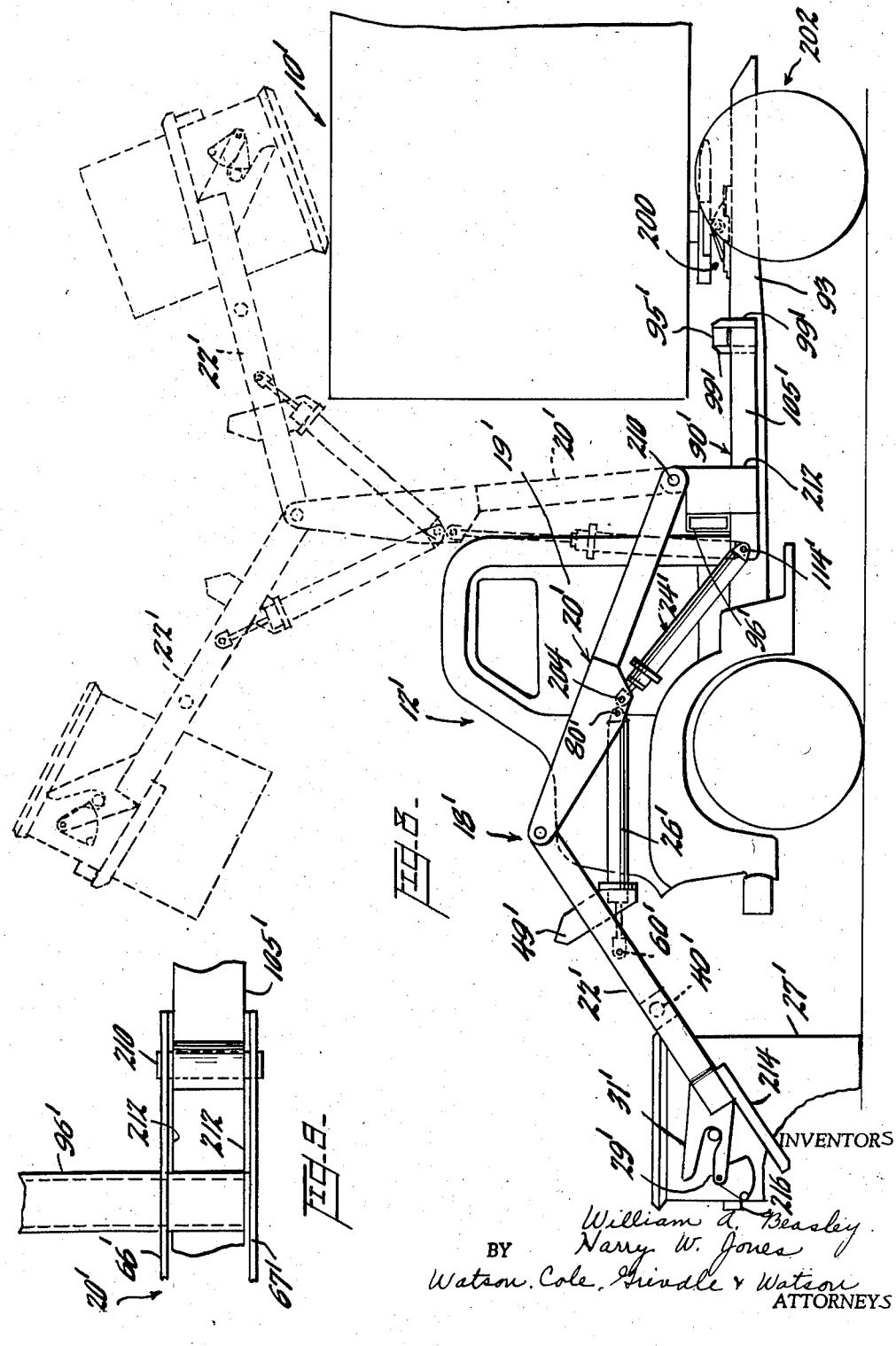

//  # United States Patent Office 2,828,032
Patented Mar. 25, 1958

2,828,032
SELF-LOADING CARGO VEHICLES

William A. Beasley, Daisy, and Harry W. Jones, Knoxville, Tenn.

Application March 7, 1955, Serial No. 492,595

6 Claims. (Cl. 214—302)

This invention relates to loading means attached to cargo vehicles so that said vehicles will be self-sufficient and will not have to rely on separate loading mechanisms. More particularly, the invention relates to front pick-up overhead loading mechanisms for cargo vehicles.

In the field of transportation, it has already been appreciated that a vehicle which carries its own loading mechanism is extremely efficient, and various vehicle attachments have heretofore been proposed for accomplishing self-loading functions. One of the most practical self-loading arrangements is a front pick-up overhead loading mechanism. Such a mechanism comprises arm units pivotally mounted on each side of the vehicle in the neighborhood of the cab section and toward the bottom of the vehicle. A container is supported on the free ends of said arm units so that when said arm units are lowered, the container is positioned on the ground in front of the vehicle, and when said arm units are raised and moved rearwardly said container is overturned and placed in dumping position above the cargo body.

The main object of the present invention is to provide a front pick-up overhead loading mechanism so arranged that no part of the mechanism extends outside the maximum width of the vehicle. There are several reasons why such an arrangement is desirable. For example, many existing vehicles are constructed so that their maximum width dimension is substantially the same as the maximum width dimension provided by vehicular laws. Accordingly, it is impractical to equip such vehicles with the existing front pick-up overhead loading mechanisms which extend out beyond the maximum width of the vehicle and consequently would render operation of the vehicle illegal. In addition, loading mechanisms which extend sideways beyond the outline of the vehicle increase the possibility of driving accidents.

Conventional cargo vehicle design is such that the cargo body constitutes the widest dimension of the vehicle, with the front fenders being only slightly narrower. Accordingly, it is a purpose of this invention to position the arm units of the loading mechanism on the vehicle so that the maximum distance between the arm units is no greater than the width of the cargo body. This purpose is accomplished by placing the pivot for each arm unit forwardly of the front of the cargo body and inwardly relative to the sides of the cargo body.

Each arm unit itself has a substantial width in order to provide the necessary strength and operating characteristics. Thus, in the case of most cargo vehicles, when the arm units are so positioned that the distance between the outer sides of the units is no greater than the width of the cargo body, then the distance between the inner sides of the arm units is less than the distance between the sides of the fenders. Further, some vehicles may be designed so that the front fenders constitute the widest dimension of the vehicle. Accordingly, a further purpose of the invention is to provide a loading mechanism having arm units which extend over the tops of the fenders when said arm units are lowered. This purpose is accomplished by the use of two-piece, pivotally interconnected arm units; more particularly, each arm unit comprises an inner or lifting arm pivotally supported on the vehicle and an outer or second arm pivotally supported by the outer end of said lifting arm. In this manner, when the arm units are lowered, the forward and rearward ends thereof may be positioned below the level of the fender tops while the intermediate portion of each arm unit is positioned over top of the fender on its side of the vehicle.

A further purpose of the invention is to provide means for mounting the loading mechanism on vehicles by an arrangement which is adapted for use in combination with most standard cargo vehicles. In addition, the mounting means are so arranged that the pivot for each lifting arm is positioned substantially behind the cab fenders for the purpose of extending the forward reach of the arm units. If the lifting arm pivots, which are lower than the fender tops, are placed near the fenders then the lifting arms can be lowered only a relatively small amount before they strike the fenders. A further purpose of the mounting arrangement is to locate the pivots for said arm units so that the arm units may be rotated to a position in which they will not interfere with the opening and closing of the vehicle doors.

Another purpose of the invention is to provide means for limiting the movements of each of the lifting and second arms so that it will not be possible for the operator to move any part of the arm units into contact with the front fenders or cargo body.

Other and further purposes, features and advantages will be apparent from the following description to be read in connection with the accompanying drawings in which:

Figure 1 is a side elevational view of a vehicle incorporating the loading mechanism and showing the arm units in various positions;

Figure 2 is a plan view of the forward portion of the vehicle and loading mechanism shown in Figure 1, showing the cargo body in transparent outline;

Figure 3 is an enlarged, partial sectional view along the line 3—3 in Figure 2;

Figure 4 is an enlarged plan view of a portion of the arm unit in the position shown by solid lines in Figure 1;

Figure 5 is a sectional view taken longitudinally of Figure 4;

Figure 6 is a diagrammatic showing of the hydraulic system and controls therefor;

Figure 7 is a schematic showing of an automatic valve controlling arrangement;

Figure 8 is a side elevational view similar to Figure 1 showing a modified form of the invention; and Figure 9 is an enlarged plan view of a portion of Figure 8 showing a detail of the lifting arm pivot.

Referring in more detail to the drawing, Figures 1 and 2 show a vehicle having a cargo body indicated at 10 and a cab portion indicated at 12, both supported on a single chassis. Body 10 is provided with an opening 11 in the top thereof, and cab 12 has fenders 13 and 14. The forward end of body 10 is indicated at 15 and the rearward end of cab 12 is indicated at 16. Thus it will be noted that a space is provided between the cab and cargo body. The loading mechanism comprises a pair of arm units indicated at 17, 18 on the opposite sides of the vehicle. Arm units 17 and 18 are similarly constructed and each comprises a lifting arm 20 supported on a pivot shaft 21 and a second arm 22 pivotally connected to the free end of lifting arm 20. The lower ends of arms 20 are pivotally connected to double-acting cylinder and piston units 24 so that when the units are extended, arms 20 will be rotated from the lowered position shown solid in Figure 1 to the raised position shown dotted. It should be noted that pivot shaft 21 is positioned rearwardly of the vehicle doors 19 so that when the lifting arms 20 are raised to the position shown dotted in Figure 1, the arm units will not interfere with the opening and closing of the doors. Single-acting cylinder and piston units 26 are pivotally connected to the arms 20 and 22 in order to rotate arms 22 around arms 20 as shown by the dotted sequence in Figure 1.

The free ends of arms 22 are adapted to support a container 27 having feet 28. An arrangement is shown for detachably supporting container 27, but if desired for special operations, the container could also be permanently attached to the free ends of arms 22. The details of the detachable arrangement do not form part of this invention and are therefore described only briefly as follows. The free end of each arm 22 carries a long finger 29 and a short finger 31 which form a slot therebetween. Container 27 has trunnions 33 extending from opposite sides thereof. Trunnions 33 are received in the slots between fingers 29 and 31 where they are held by gravity until container 27 is moved toward the dumping position shown dotted toward the right of Figure 1. As the container approaches the dumping position, the slots are closed and trunnions 33 are locked in position by gravity actuated latches 37 which are pivotally supported at 38 by fingers 29, as shown in Figure 1. Gravity causes the latches to rotate and open the slots as the container is moved forwardly, as shown by the dotted sequence in Figure 1. In order to limit the rotation of container 27 relative to fingers 29, 31 and thus accomplish overturning of the container as shown dotted in Figure 1, a transverse connecting bar 40 is provided between arms 22, and notched flanges 42, 43 are attached to container 27 for engagement with bar 40.

As will be observed from Figure 2, the maximum distance between the outer sides of arm units 17 and 18 is less than the maximum width of cargo body 10. In addition, the minimum distance between arm units 17 and 18 is less than the distance between the sides of fenders 13 and 14, so that when the arm units are in the lowered or forward position they pass over the tops of fenders 13 and 14. The main object of the invention is to provide an arrangement whereby the maximum distance between the outer sides of the arm units 17 and 18 is no greater than the maximum width of the vehicle. Normally, the cargo body constitutes the maximum width dimension of the vehicle, and therefore in the usual case the maximum distance between the outer sides of the arm units 17 and 18 must be no greater than the maximum width of the cargo body. Also in the case of usual vehicle design, positioning of the arm units within the line of the cargo body requires that the arm units pass over tops of the cab fenders when the arm units are lowered. In the case of special vehicles in which the cab fenders constitute the maximum width dimension, then obviously the maximum distance between the outer sides of the arm units must be no greater than the maximum distance between the sides of the cab fenders.

Since the arm units 17 and 18 operate within the side lines of the cargo body and cab fenders, the second arms 22 of the units are provided with means for limiting rocking movement about the lifting arms 20. Such limiting means comprises stop members 49. As shown in Figures 4 and 5, stops 49 are channel shaped members having side flanges 51 and 52 forming the abutment surfaces 54 and 55 which are alternately engaged by collar 57 on the cylinder portion 58 of unit 26. The piston rod 59 of unit 26 is pivotally connected to pin 60 which extends between the flanges 51 and 52, which flanges are in turn connected, for example by welding, to the side plates 61 and 62, respectively, of the second arm. Lifting arms 20 are formed by a plurality of spaced plates 66 and 67 to which are attached additional plates 68 and 69, respectively. The ends of plates 68 and 69 are bent outwardly from plates 66 and 67 to form slots in which plates 61 and 62 are rotatably supported by pins 72 and 73. As will be apparent from Figures 1 and 4, collars 57 on cylinders 58 engage abutment surfaces 54 when arms 22 are rotated counter-clockwise, and the collars engage abutment surfaces 55 when the arms are rotated clockwise.

As shown in Figures 1 and 2, cylinders 58 are pivotally connected to lifting arms 20 by the pins 80. It will be noted that clockwise rotation of arms 20 must be limited so that no part of the arm units will strike the cargo body 10. The specific means for assuring such limited rotation will be described hereinafter but it should be noted that when arms 20 are raised, they are limited to a substantially vertical position and therefore pivot points 60 and 80 must be offset forwardly of the centerlines of arms 22 and 20, respectively, in order to provide a moment arm for forcing arms 22 over top dead center when arms 20 are raised to the position shown dotted in Figure 1.

As shown best in Figures 2 and 3, the loading mechanism is entirely supported on a separate auxiliary frame indicated generally at 90 and entirely supported by the main longitudinal frame members 92 and 93 of the vehicle chassis. Auxiliary frame 90 comprises two transverse members 95 and 96 resting on top of members 92 and 93. Transverse member 95 is attached to member 92 by means of the braces 98 and to member 93 by the similar braces 99. Transverse member 96 is attached to members 92 and 93 by means of an angle brace on each side of each of the members 92 and 93, one such brace 102 being shown in Figure 3. Transverse members 95 and 96 are interconnected at opposite ends by longitudinal connectors 104 and 105, which are welded or otherwise secured across the bottoms of members 95 and 96, and the frame thus formed is braced by the diagonals 107 and 108.

The rearward ends of connectors 104 and 105 carry pins 112 and 114 which support the cylinder and piston units 24 which operate the arm units 17 and 18, respectively. The opposite ends of transverse member 96 support the bearing blocks 121 and 122, respectively, and pivot shaft 21 is journalled in said blocks. As a support measure, gusset plates 125 and 126, respectively, are welded across the opposite ends of transverse member 96, the sides of connectors 104 and 105, and the lower sides of bearing blocks 121 and 122. It will be noted that the arrangement of auxiliary frame 90 positions the pivot shaft 21 rearwardly of the cab 12 in the space between the cab and the cargo body 10. This arrangement accomplishes several purposes; first, it places the pivot 21 for lifting arms 20 substantially behind the fenders 13 and 14 so that arms 20 may be lowered to an angle approaching horizontal and thus extend the reach of prongs 29, and second, it avoids cutting any portion of the vehicle to make room for shaft 21.

Figure 6 shows a diagrammatic arrangement of the hydraulic system for operating the cylinder and piston units 24 and 26. A power take-off 130 is driven by the vehicle engine and in turn drives a pump 131 by means of shaft 132. A valve box 134 is connected by tube 135 to the high pressure side of the pump and by tube 137 to a reservoir 138, which in turn is connected by tube 139 to the low pressure side of pump 131. Valve box 134 is of conventional construction and contains two reciprocating valves 141 and 142 which control flow through the tubes 143, 145 and 146, 148, respectively. Valve 142 controls the single acting cylinders 26 and therefore tube 148 is plugged. Tube 145 is connected to the rearward ends of cylinder units 24 by tube 152 so that when high pressure fluid is admitted to tube 152, units 24 will be expanded to raise arms 20. Tube 143 is connected to the forward ends of cylinder units 24 by tube 150 so that when high pressure fluid is admitted to tube 150, units 24 will be collapsed to lower arms 20. Tube 146 is connected to the inner ends of cylinder units 26 by tube 154 so that when high pressure fluid is admitted to tube 154, units 26 will be expanded to rotate arms 22 about arms 20, and when high pressure fluid is vented from tube 154, gravity will collapse units 26.

The valves 141 and 142 are shown in neutral positions, in which they close off each tube 143, 145 and 146, and provide free circulation from tube 135 to tube 137. When the valve 141 is moved inwardly, it connects tube 135 with tube 143, and connects tube 145 with tube 137, so that high pressure fluid is admitted to the forward ends of units 24 and drained from the rearward ends to lower arms 20. When valve 141 is moved outwardly, it connects tube 135 with tube 145, and connects tube 143 with tube 137, so that pressure fluid is admitted to the rearward ends of units 24 and drained from the forward ends to raise arms 20. When the valve 142 is moved inwardly, it connects tube 135 with tube 146 to expand units 26, and when valve 142 is moved outwardly, it connects tube 146 with tube 137 to vent units 26 to the reservoir and thus permit gravity to collapse units 26. Valves 141 and 142 are actuated by the push-pull cables 157 and 158, respectively, which are in turn actuated by the levers 159 and 160. Levers 159 and 160 are pivotally supported as indicated at 161 and 162, preferably on the steering column of the vehicle in the neighborhood of the usual gear shift lever.

Figure 7 is a schematic showing of the means for automatically limiting the movement of arms 20 so that they cannot strike the fenders 13 and 14 or the cargo body 10. As shown in Figures 3 and 7, an arm 170 is secured to pivot shaft 21 so that the arm will rotate in unison with arms 20 which are also secured to the shaft. Arm 170 has pivotally attached thereto a collar 172 which is slidably fitted on a rod 174 for movement along the rod between the stop nuts 175 and 176, which are adjustably threaded on the rod. The lower end of rod 174 is pivotally attached to arm 176 of a T-lever 177 which is pivotally supported by a link 178, which in turn is pivotally attached to valve box 134. The arm 179 of lever 177 is pivotally connected to the valve stem 141, and the arm 180 is connected to cable 157. Thus, if cable 157 were moved to the left in Figure 7, valve 141 would be moved outwardly, and if cable 157 were moved to the right, valve 141 would be moved inwardly.

In the position shown in Figure 7, valve 141 is in the neutral position and arm 170, as shown solid, is in the position it assumes when arms 20 have been lowered to the position shown solid in Figure 1. As explained in connection with Figure 6, inward movement of valve 141 would lower arms 20. However, it will be seen in Figure 7 that it is impossible to push cable 157 to the right and thus move the valve inwardly because the stop nut 175 abuts the top of collar 172. In this manner the vehicle operator is automatically prevented from lowering arms 20 so far that they strike the fenders 13 and 14.

When the operator wishes to raise arms 20, he pulls cable 157 which moves valve 141 outwardly and raises rod 174 through collar 172. As arms 20 move upwardly to the position shown dotted in Figure 1, arm 170 moves downwardly to the position shown dotted in Figure 7. However, as the arm 170 is moved toward the dotted position, collar 172 engages the stop nut 176, and by the time arm 170 reaches the dotted position, collar 172 has forced rod 174 to the dotted position in which the T-lever 177 is again in neutral position. Thus, when arms 20 have been rotated to the desired raised position, the operator is unable to rotate them further because collar 172 abuts nut 176 and prohibits the outward movement of valve 141 which is necessary to cause raising movement of arms 20.

A modified form of the invention is shown in Figure 8, in which a self-loading mechanism is mounted on a semi-trailer type truck to operate within the maximum width dimension of the truck in the same manner as shown in Figure 2. Figure 8 shows a semi-trailer vehicle having a trailer type cargo body 10' pivotally supported on a conventional hitch 200 which is secured to the chassis of the tractor unit 202. Tractor 202 has the cab 12' and a pair of longitudinal frame members, one being shown at 93'. The lifting arms 20' are similar to arms 20 in Figure 1 except that they do not extend downwardly beyond their pivot points. Instead of connecting cylinder and piston units 24' to the lower ends of arms 20', units 24' are connected to the arms at 204.

As in the case of the form shown in Figures 1-7, twin arm units are provided on opposite sides of the vehicle, with arm unit 18' being shown in Figure 8. The arm units are supported on a separate frame 90' which is similar to the frame 90 in Figures 1-3. However, the arm units 20' are supported in slightly different manner on frame 90', as shown in detail in Figure 9 for one side of the vehicle. Shaft 21 has been dispensed with and each lifting arm 20' is separately supported by a pin 210 which is carried between plates 212. Plates 212 are welded across opposite sides of the longitudinal connector 105' adjacent the rear of transverse member 96' which is box-shaped. In addition, pivot 114' for the cylinder and piston unit 24' is positioned at the front of member 105', rather than at the rear as in Figures 1 and 2. It should be noted that pivot 210 is positioned well forward of trailer body 10' so that the self-loading mechanism will not interfere with movement of trailer 10' on its pivot 200.

The lifting arms 22' have stop members 49' which are the equivalent of stop members 49. However, it will be noted in Figure 8 that the cylinder and piston units 26' are pivotally connected to the centers of arms 22' outwardly of stops 49', and therefore, stops 49' do not extend between plates 66' and 67' of arms 22' so that the movement of units 26' about pivots 60' will not be hindered. The forward ends of arms 22' carry the prongs 29' and 31' and also the latch 37', all of which operate in the same manner as the equivalent members 29, 31 and 37 in Figure 1. However, slightly different means are provided for limiting rotary movement of container 27'. The different arrangement comprises bars 214 which are attached to the ends of arms 22' for engagement with a bar 216 which is welded across the end of container 27' and extends outwardly beyond each side of the container. The transverse bar 40' may be retained to interconnect the arms 22' but it does not engage container 27'.

In order to facilitate an understanding of the invention, reference has been made to the embodiments thereof shown in the accompanying drawings, and detailed descriptive language has been employed. It will nevertheless be understood that no limitation of the invention is thereby intended and that various changes and alterations are contemplated such as would ordinarily occur to one skilled in the art to which the invention relates.

Having thus described the invention, what is claimed as new and desired to be secured by Letters Patent is:

1. In combination with a vehicle having a cargo body positioned rearwardly of a cab portion having front and rear fenders, a front pick-up overhead loading mechanism comprising two arm units each comprising a lifting arm supported by said vehicle for rocking movement about a pivotal axis extending transversely of said vehicle and located rearwardly of said front fenders, a second arm pivotally connected to the free end of each of said lifting arms, means for supporting a container on the free ends of second arms, means for rocking said lifting arms about said pivotal axis between a lowered position over top of said fenders and a raised position adjacent said cargo body, means for rocking said second arms about their said pivotal connections between positions on opposite sides of said lifting arms, said vehicle having a maximum width dimension, the maximum distance between said arm units on opposite sides of said vehicle being no greater than said maximum width dimension, the lower end of each of said lifting arms extends beyond its pivot, and said means for rocking said lifting arms comprise two cylinder and piston units, one for each of said arms, each said cylinder and piston unit being connected between said vehicle and the lower end of its respective lifting arm.

2. In combination with a vehicle having a cargo body positioned rearwardly of a cab portion having front and rear fenders, a front pick-up overhead loading mechanism comprising two arm units each comprising a lifting arm supported by said vehicle for rocking movement about a pivotal axis extending transversely of said vehicle and located rearwardly of said front fenders, a second arm pivotally connected to the free end of each of said lifting arms, means for supporting a container on the free ends of second arms, means for rocking said lifting arms about said pivotal axis between a lowered position over top of said fenders and a raised position adjacent said cargo body, means for rocking said second arms about their said pivotal connections between positions on opposite sides of said lifting arms, said vehicle having a maximum width dimension, the maximum distance between said arm units on opposite sides of said vehicle being no greater than said maximum width dimension, said means for rocking said lifting arms comprise two cylinder and piston units, one connected between said vehicle and each of said lifting arms, the connection between each cylinder and piston unit and its respective lifting arm being positioned between said free end of said lifting arm and said pivot for said arm.

3. In combination with a vehicle having a cargo body positioned rearwardly of a cab section including fenders, a front pick-up overhead loading mechanism comprising two lifting arms, one on each side of said vehicle, said arms each being supported by said vehicle for rocking movement about a pivot positioned rearwardly of said fenders and having its axis extending transversely of said vehicle, a second arm pivotally connected to the free end of each of said lifting arms, means for supporting a container on the free ends of said second arms, means for rocking said lifting arms about their said pivots between a lowered position adjacent said fenders and a raised position adjacent the front of said cargo body, means for rocking said second arms about their said pivotal connections between positions on opposite sides of said lifting arms, the width of said cargo body and the distance between said fenders being greater than the minimum distance between the lifting arms on opposite sides of said vehicle, whereby said lifting arms if lowered too far would strike said fenders and if raised too far would strike said cargo body, and means for limiting the movement of said lifting arms so that said arms will not strike said fenders or said cargo body, said means for rocking said lifting arms comprising fluid operated cylinder and piston means, and said movement limiting means comprising means operated by rocking motion of said lifting arms for controlling fluid flow to said cylinder and piston means.

4. The combination claimed in claim 3 in which the width of said cargo body and the distance between said fenders are each greater than the minimum distance between the second arms on opposite sides of said vehicle, and means are provided for limiting the rocking movement of said second arms about their said pivotal connections so that said second arms will not strike either said fenders or said cargo body.

5. In combination with a vehicle having a cargo body spaced rearwardly of a cab having fenders, a front pickup overhead loading mechanism comprising two lifting arms, one on each side of said vehicle, said arms each being pivotally supported by said vehicle, a second arm pivotally connected to the free end of each of said lifting arms, means for supporting a container on the free ends of said second arms, means for rocking each lifting arm about its said pivotal support between a lowered position over top of said fenders and a raised position adjacent said cargo body, means for rocking said second arms about their said pivotal connections between positions on opposite sides of said lifting arms, said pivotal support for said lifting arms comprising a shaft supported above the chassis of said vehicle and positioned in said space between the cargo body and the cab, whereby said lifting arms may be lowered to a relatively small angle above horizontal before striking said fenders.

6. In combination with a vehicle having front fenders, a loading mechanism comprising two lifting arms, one on each side of said vehicle, each of said arms being pivotally connected to said vehicle at a point positioned rearwardly of said fenders, means for rocking said lifting arms about their said pivotal connections between a lowered position adjacent the tops of said fenders and a raised position, said lifting arms being at least partially within the plan outline of said fenders when said arms are in said lowered position, so that said lifting arms cannot be lowered below the tops of said fenders, said loading mechanism further comprising two second arms pivotally connected respectively to the free ends of each of said lifting arms, and means for rocking said second arms about their said pivotal connections, whereby the free ends of said loading mechanism may be extended forwardly of said vehicle and below the tops of said fenders, said vehicle including a door and said pivotal connections for said lifting arms being positioned rearwardly of said door, whereby said door may be opened when said lifting arms are raised to a substantially vertical position.

References Cited in the file of this patent

UNITED STATES PATENTS

| | | |
|---|---|---|
| 1,256,401 | Ward | Feb. 12, 1918 |
| 2,286,723 | Frost | June 16, 1942 |
| 2,441,591 | Owen | May 18, 1948 |
| 2,571,113 | Crosby | Oct. 16, 1951 |
| 2,626,070 | Ezell et al. | Jan. 20, 1953 |